US007664801B2

(12) United States Patent
Walker

(10) Patent No.: US 7,664,801 B2
(45) Date of Patent: Feb. 16, 2010

(54) INTERACTIVE REMOTE WIRELESS SYSTEM AND METHOD TO ASSIST IN REAL ESTATE TRANSACTIONS, AND THE LIKE

(76) Inventor: Timothy Walker, 2810 Foxglove Way, Springdale, MD (US) 20774

(*) Notice: Subject to any disclaimer, the term of this patent is extended or adjusted under 35 U.S.C. 154(b) by 0 days.

(21) Appl. No.: 12/143,396

(22) Filed: Jun. 20, 2008

(65) Prior Publication Data

US 2009/0182749 A1 Jul. 16, 2009

Related U.S. Application Data

(63) Continuation of application No. 12/007,421, filed on Jan. 10, 2008.

(51) Int. Cl.
*G06F 17/30* (2006.01)

(52) U.S. Cl. .......................... 707/707; 705/1; 340/5.73

(58) Field of Classification Search ................ 705/1–6, 705/26, 38, 40; 701/203, 207, 213; 707/3, 707/10, 100, 104.1; 340/5.25
See application file for complete search history.

(56) References Cited

U.S. PATENT DOCUMENTS 5,584,025 A 12/1996 Keithley
5,835,236 A 11/1998 Barbari
6,385,541 B1 5/2002 Blumberg
6,415,285 B1 7/2002 Kitajima
6,484,176 B1 11/2002 Sealand
6,624,742 B1 9/2003 Romano
6,871,140 B1 * 3/2005 Florance et al. ............. 701/207
6,985,902 B2 1/2006 Wise
7,080,096 B1 7/2006 Imamura
7,430,555 B2 * 9/2008 Sealand et al. .............. 707/100
2002/0062277 A1 * 5/2002 Foster et al. .................. 705/38
2003/0033176 A1 * 2/2003 Hancock ........................ 705/6
2003/0064705 A1 * 4/2003 Desiderio ................... 455/412
2004/0030616 A1 * 2/2004 Florance et al. ............... 705/27
2004/0049406 A1 3/2004 Muncaster
2005/0246273 A1 * 11/2005 Farley ......................... 705/40
2005/0288955 A1 * 12/2005 Lewiss-Hachmeister ....... 705/1
2006/0020518 A1 * 1/2006 Lovison et al. ................ 705/26
2007/0290799 A1 * 12/2007 Harkins et al. ............. 340/5.73
2008/0162575 A1 * 7/2008 Koulis et al. ............. 707/104.1

* cited by examiner

*Primary Examiner*—Pierre M Vital
*Assistant Examiner*—Christopher J Raab
(74) *Attorney, Agent, or Firm*—Fitch, Even, Tabin & Flannery; John M. Naber

(57) ABSTRACT

A system and apparatus to provide remote interactive access to multiple databases and, specifically, related to a system and apparatus to provide remote interactive access to real estate information related databases using a portable, voice interactive computing device with GPS capabilities and "smart" computer features. The system combines access to search engines configured to retrieve real estate listings, publicly available statistics about a specific geographic area, and retrieval of stored forms specific to completing an offer for real estate. The device can have several components in various combinations including a touch sensitive screen, a keyboard, a processor, GPS circuitry, a microphone, an audio device, wireless circuitry, cellular circuitry, a data jack, a wireless remote, and a camera. Software utilizing those components maximizes efficiency for a real estate agent in the field.

5 Claims, 2 Drawing Sheets

MOBILE OFFICE
VOICE ACTIVATED
SEARCH NEIGHBORHOOD STATS
SEARCH REAL ESTATE LISTINGS
GPS INSTALLED
BANKING NEEDS
ZIP FORM CONTRACTS
ELECTRONIC SIGNATURE
DELIVER OFFER
RESPONSE
SCHEDULE EVENTS

INTERACTIVE REMOTE WIRELESS SYSTEM AND METHOD TO ASSIST IN REAL ESTATE TRANSACTIONS, AND THE LIKE

CROSS REFERENCE TO RELATED APPLICATIONS

This is a continuation of U.S. application Ser. No. 12/007,421 filed on Jan. 10, 2008.

FIELD OF THE INVENTION

The present invention is generally related to a system and apparatus to provide remote interactive access to multiple databases and, specifically, related to a system and apparatus to provide remote interactive access to real estate information related databases using a portable, voice interactive computing device with GPS capabilities and "smart" computer features.

BACKGROUND OF THE INVENTION

In today's fast paced service industries, time and efficiency are critical. Nowhere is this more evident than in the buying and selling of real estate. In "hot" real estate markets, the ability to get a signed offer to a seller often decides who gets a property and, for the agent or broker, the commission. Despite this "need for speed," it is still important for the buyer to have a property that suits their needs and their budget.

Various types of informational processing systems are known for acquiring and displaying information related to a specific industry or interest, such as real estate and related goods and services. These systems typically are server based, which have an input/output device for receiving and transmitting data, database files, and database storage. The compilation of information in the databases can include demographic statistics and are known in the art. Unfortunately, a major disadvantage of known prior art is that the user has to be directly connected to a server, requiring a stationary terminal such as a desktop computer. For example, it is known that the MLS (Multiple Listing Service) database is updated continuously. However, as a practical matter, real estate agents do not have continuous access to the MLS, even with access to wireless laptop computers. Consequently, real estate agents, and therefore their clients, generally only learn about new or updated listings during an MLS database access session conducted at the agent's office or home.

Sealand et al (U.S. Pat. No. 6,484,176) discloses a system and process for providing remote interactive access to a real estate database using a portable computing device. However, this system cannot interact with a real estate agent, clients, and homeowners selling real estate simultaneously utilizing available technology such as voice activation, global positioning, integrated smart key card with camera and voice recorder, electronic signature capability, integrated voice activated phone, pre-loaded real estate forms and contracts, network of service professionals in a subscriber's geographic area such as: home inspectors, termite inspectors, insurance brokers, mortgage companies, moving and storage companies, settlement attorneys, and the like.

There is a desire and need in service industries, and particularly the real estate transfer industry, to optimize time and efficiency. Thus, it is desirable to provide a single, all-in-one real estate system, method, and apparatus that is portable and provides a flexible solution for remotely accessing real estate related databases in an interactive fashion and in communication with all parties involved with a real estate transaction.

SUMMARY OF THE INVENTION

Accordingly, the present invention is generally related to a system and apparatus to provide remote interactive access to multiple databases and, specifically, related to a system and apparatus to provide remote interactive access to real estate information related databases using a portable, voice interactive computing device with GPS capabilities and "smart" computer features.

Specifically, in one embodiment of the present invention, the system provides remote interactive access to real estate related databases using a portable computing device, a portable hand-held computing device connected to a data network containing both program code and data, a first database comprising a search engine configured to retrieve real estate listing data from an information database further comprising a set of parameters describing an individual real estate property listing, a second database comprising a search engine configured to retrieve publicly available statistics about a specific geographic area, a third database comprising a search engine configured to retrieve stored forms specific to completing an offer for real estate, and a remote client server defining methods for accessing the real estate information database through the database search engines.

The device can have several components in various combinations including a screen. a keyboard, a processor, GPS circuitry, a microphone, an audio device, wireless circuitry, cellular circuitry, a data jack, a wireless remote, and a camera. The screen can be touch sensitive, allowing collection of digital signatures. The GPS circuitry can allow integration with software to integrate GPS coordinates with selected real estate listings to develop an efficient route of access to the real estate. The wireless remote can be configured to allow access to electronic key boxes at the location of the real estate, and the camera can be integrated in a video conference or for taking pictures of a property.

Additional aspects and advantages of the invention will become apparent from the following detailed description, the drawings, and the appended claims.

BRIEF DESCRIPTION OF THE FIGURES

The foregoing features, as well as other features, will become apparent with reference to the description and figures below, in which like numerals represent like elements, and in which.

DETAILED DESCRIPTION OF THE INVENTION

Figure 1:
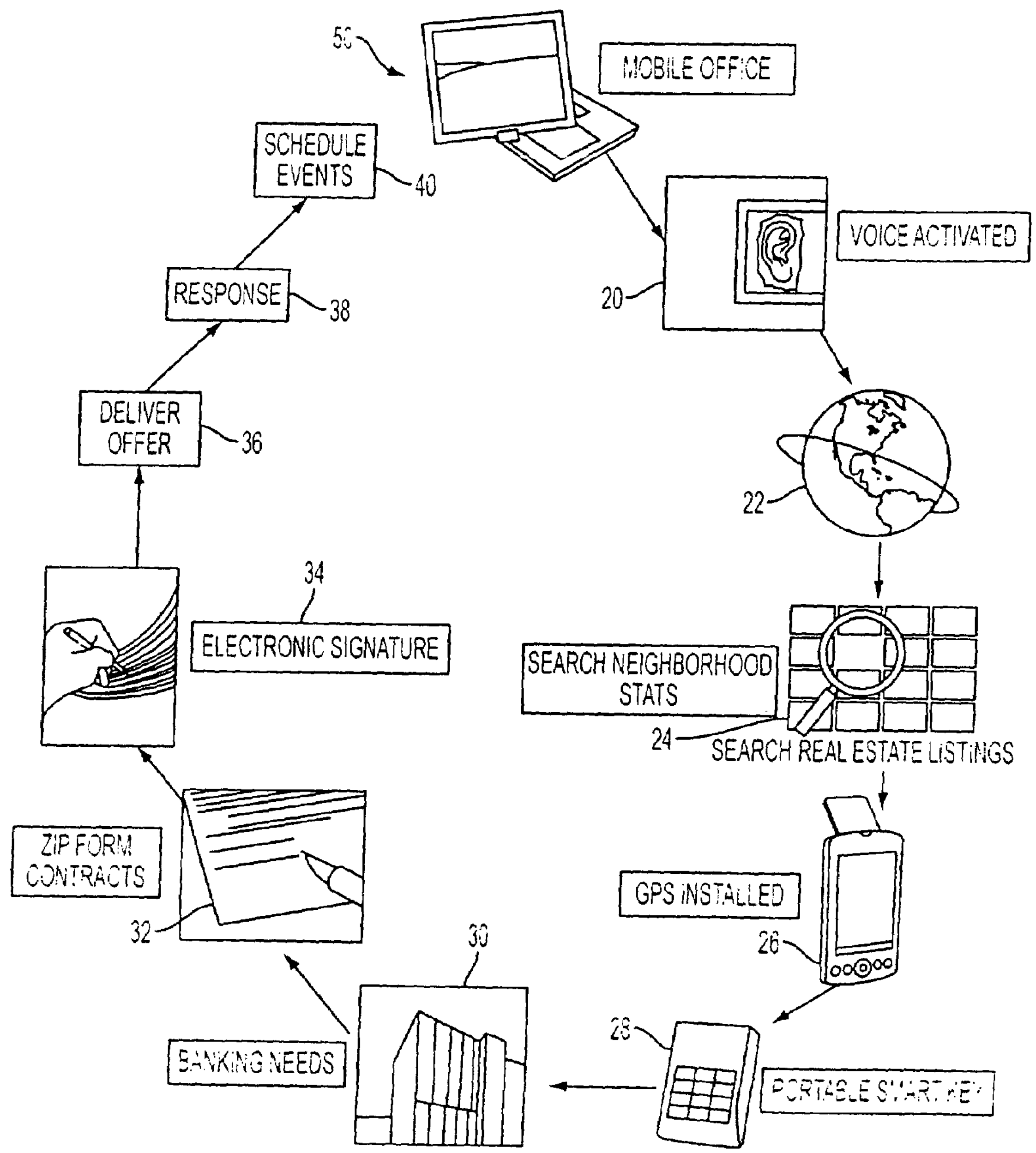
FIG. 1 is a schematic of information flow in accordance with one embodiment of the present invention.

The present invention is generally related to a system and apparatus to provide remote interactive access to multiple databases and, specifically, related to a system and apparatus to provide remote interactive access to real estate information related databases using a portable, voice interactive computing device with GPS capabilities, "smart" computer features, integrated smart key card with camera and voice recorder, electronic signature capability, integrated voice activated phone, pre-loaded real estate forms and contracts, network for appointments of service professionals to include home inspectors, termite inspectors, insurance brokers, mortgage companies, moving and storage companies, settlement attorneys, and the like. This system and remote interactive methods are not limited to the real estate industry, but can be used in a wide range of service and industrial sectors including, but not limited to, investment groups, property management companies, government regulatory agencies, and the like.

General aspects of the present invention portable system in various combinations can include: access to databases related to an industry, such as the real estate industry; access can be by a wireless portable interactive computing device which may be responsive to voice activated commands.

A calendar/planner to which a user can download appointments, and the system automatically remind the user of scheduled appointments and/or set reminders.

Allows real time automatic database updates and notification in the field of any updates to databases (such as when a property scheduled to be visited has a change in status that would render a visit unproductive, such as being put under contract or pulled off the market).

Notification to a user en route to a property whether a key from lock box is in use.

Ability to communicate with real estate professionals, lending institutions, and related industries to allow prompt scheduling of appointments with home inspectors, termite inspectors, insurance brokers, settlement attorneys, moving and storage companies, remodeling and renovations contractors (e.g., landscaping, irrigation, electrical, plumbing, roofing and siding, HVAC, window and doors, flooring, painting, drywall, appliances, home improvement, carpenters (framing and finish carpentry such as molding, trim, and cabinet insulation), brick and masonry, insulation, water proofing, locksmith, fireplace and chimney, professional cleaners, interior designers, furniture stores, home entertainment, interior and exterior lighting specialists, security, and the like).

Built in camera combined with a digital audio recorder.

Built in key card (universal smart card) to access real estate electronic lock boxes to view property and/or access information from the built-in camera and voice recorder for later review.

Allow for the authentication of documents through electronic signatures via built-in electronic pen, allowing real-time execution of contracts and or other documents while showing properties of interest to respective clients.

Access to banking needs and transactions through financial information, mortgage products, interest rates, mortgage applications, lender approval letter, and current financial trends in real time.

A GPS receiver for receiving spread spectrum GPS satellite signals from a variety of satellites.

GPS lat/long coordinate mapping software to assist in cutting time and effort in planning and viewing properties by enabling a user to enter, in no particular order or sequence, a listing of properties to be viewed and, based on the start and finish location of the agent/client and the geographic location of the properties, the system will automatically determine the most efficient route.

Wireless telephone capability that, combined with hands-free voice activation and/or secure communication technology, allows a real estate professional to handle cell calls, providing tremendous safety benefits while on the road.

The system may contain an annual financial profiler or tracker that can allow a subscriber to keep daily, weekly, monthly, and yearly account of income earned through commissions and the like, along with any and all expenses incurred during those same time periods. This can allow the subscriber to stay on track with their set financial goals, while simultaneously maintaining extremely accurate records that the independent contractor or self employed individual can efficiently print and provide or email to their respective tax preparer. Thus, the system can become the subscriber's personal bookkeeper as well.

The system can also contain an optional program specific for brokers that would enable them to access information of selected salespersons or realtors into their database of associates to also track and access selected production criteria on demand.

In use, the various features can be used, for example, to take photographs of a property visited, which can be emailed from the database system to a client, download data into electronic contracts, schedule appointments for viewing property, all of which can be supplemented with cellular calls via the same unit. The system can also be configured to automatically notify of or inquire into new, updated real estate listings or changes in the real estate search criteria. Databases could be accessed to obtain neighborhood crime data, local school statistics, public transportation, restaurants, parks, medical services, or other neighborhood information that can be correlated with the GPS coordinates or through specified regions by the user.

Figure 2:
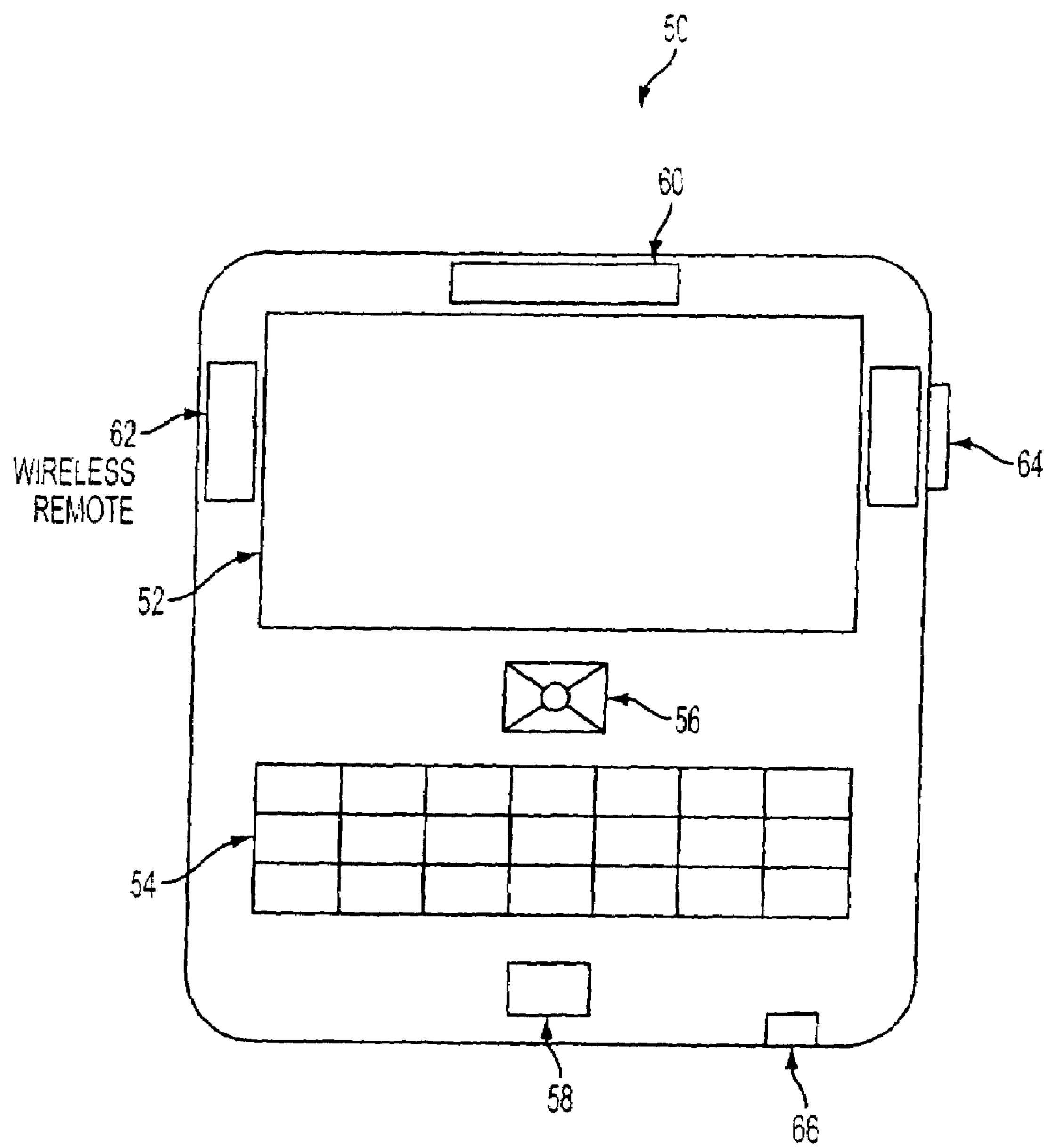
FIG. 2 is diagram of a portable remote interactive device in accordance with one embodiment of the present invention.

There are two principal sets of components needed to practice the present invention: a real estate informational database system (FIG. 1) and the portable interactive remote device (FIG. 2).

Referring now to the figures, FIG. 1 is an information flow diagram for a system for providing a portable interactive remote wireless system for access to real estate related information databases in accordance with a first embodiment of the present invention. This system can use a portable interactive remote device, generally indicated at 50 (shown more specifically in FIG. 2), as the system access point for a user, plus various other types of servers.

The real estate information system will have access through device 50 to real estate multiple listing searchable databases operatively coupled to a database supplying banking needs, electronic legal document templates, insurance quotes, and the like. As illustrated, the system, by voice activated commands 20, can access the MLS database (indicated at 22) for a set of listing records that each contain a set of characteristics describing the real estate property listing. There are ten potential classes of properties: single family residential, common interest development, multi-residential, mobile homes, residential lots and lands, commercial lots and lands, commercial/industrial, business opportunity, commercial rental, and residential rental. Within each class, a listing record can include various sets of characteristics, including characteristics pertaining to interior, exterior, additional information, and remarks. Within each of these sets of characteristics, further criteria can be specified, such as for an interior, type, style, bedrooms, bathrooms, and so on. The database can be searched by specifying these individual characteristics.

As further described below, database servers can include a random access memory (RAM) into which is loaded and executed a search engine capability which can be accessed from the portable device. The search engine interfaces to databases for the storage, retrieval, and searching of listing records stored within the database also includes periodical updates. The search engine can calculate properties of interest defined by a number of criteria, such as square footage, number of bedrooms, bathrooms, school districts, by subdivisions, and the like. In addition, the database server includes serial ports and an electronic banking access. Banking capabilities can be used to verify reserves of monetary funds in a defined account, qualification for a price range for a real estate transaction, or transfer of funds into an earnest banking account.

To illustrate the benefits of the present invention, a potential use of the device having many of the described features could be as follows.

A user (here, a real estate professional) conducts a due diligence with a potential buyer on the type of property they wish to purchase (e.g., the number of bedrooms, number of bathrooms, square footage, neighborhood preferences, school districts, style of property, and the like). The user can enter this data as a client profile into the system using voice 20, keyboard, touch sensitive screen, and the like. The system can then immediately search the MLS 22 for properties that match these specifications. Additionally, the system can arrange to periodically check the MLS for new properties that meet the buyer's profile in order to automatically update and report the new properties to the user. Neighborhood statistics 24 can also be obtained.

Once the user obtains these properties, they can be forwarded to the buyer to view. The system can then schedule appointments to see properties that are desired by the buyer. The system can call the contact for the property for scheduling. If multiple properties are scheduled, the optional GPS 26 can set a logical route with step-by-step instructions to direct the user to each of the properties. The routes can be based on automatically mapping the most efficient order and route for viewing based on starting point and distance from each property.

When each property is reached, a remote wireless device 28 can trigger the local electronic lock box having the key to open the lock box. This can be automatic as well by synching automatically with the electronic lock box, allowing the user access to the property. This will be a significant improvement over the present process of accessing keys for properties by electronic lock box. Thus, the system with a built in key card, upon arriving at a property, will automatically release the key via infrared/wireless connection, thus eliminating the need for the user to physically manipulate the lock box at the property's door, with all the other things a user would typically be carrying in this situation.

During and after showing a property, the user can take notes and photos of the buyer's and user's comments using the system's dischargeable key card. The system can record voice notes so these do not have to be written down. The device may be configured to record oral voice notes through a very slim and light palm-held dischargeable key card which can very easily be carried by the user, separate and apart from the device. Similarly, the device or its key card may be used to take photographs of the site. All data recorded apart from the device can be synched later, when the key card is returned to the device. This feature can help tremendously because some buyers want users to show them properties several times before making a decision to purchase because they forget what the property looks like and what they liked about the property. The system will thus drastically reduce the number of repeat showings, which in turn saves the user time and money to do what they are supposed to be doing: conducting efficient business.

At some point, the buyer may want to write an offer on a property. Typically, a purchaser or their agent would need to go back to their office to prepare, copy, sign, and distribute this document, losing precious time. Other documents, such as a lender letter, copy of a check for earnest money deposit, seller's disclosure statement, lead-based paint, etc., are also needed. The system of the present invention will alleviate this step by allowing a user to immediately access their banking needs 30 and contract forms 32 by clicking on the particular property already downloaded in the system. The system has the ability to automatically download data into a contract and assemble previously scanned copies of all the related documents. The user need only input offer price, special conditions, earnest money deposit, etc. The system allows for digital signatures 34 and e-faxing or other means of sending the offer 36 to the cooperating agent and or seller. This can be accomplished within minutes of a buyer making this decision, including scanning or taking a photo of the deposit check. Alternatively, the buyer may have the ability to wire money through the system to the seller's agent.

The user can then use the system to call the seller's agent to inform them that a contract has been sent. The system can alternatively send an automatic digital notification to the subscribing listing agent that a contract was sent and who the seller's agent needs to contact for questions, concerns, ratified contracts, or counter-offers. The system can have the buyer's agent's cell phone linked to it and, with a simple voice activated command, will instruct the system to contact the listing agent, alerting that agent of the sent contract. The system next waits for a response 38, which can be promptly and automatically forwarded to the buyer upon receipt.

Additional features of the system can also facilitate prompt referrals and scheduling of events needed to complete the transaction, such as inspections, loan applications, attorney review, insurance coverage, settlement company, and the like. The system may have subscribers or preferred vendors of these services which the system can automatically select and set appointments with the appropriate inspector. The system can notify the user and/or buyer when appointments have been scheduled and send confirmation emails to client and inspector.

The system can also assist the user in the role of the seller's agent. The system can prepare reports of recent real estate activity and trends, analysis of appropriate listing price, closing cost predictions, and the like. Again, the system can prepare and execute all the necessary documents to list a property.

As shown in FIG. 2, a portable device to illustrate one embodiment of the present invention is shown generally at 50. Device 50 can have a screen 52, optionally touch sensitive, a keyboard 54, a processor 56, GPS circuitry (not shown, but well known in the art), a microphone 58, an audio device such as a speaker 60, wireless circuitry and cellular circuitry (not shown, but again well known in the art), a wireless remote 62, and a camera 64. Where screen 52 is touch sensitive, digital signatures are possible. This would be useful for embodiments that utilize a bank of forms that require signatures of the buyer, seller, or other real estate professionals. The GPS circuitry can be useful for a variety of applications where location of device 50 can be used to facilitate a user. Wireless remote 62 can be used to allow access to electronic key boxes on location of the real estate. Camera 64 can be used for video conferencing or for taking pictures of a property. The device further contains a headphone/microphone jack 66 and a jack 67 that accepts a data memory media for additional data storage, such as a secured digital (SD) card and the like. As described above, microphone 58 can be used to interface voice commands or for use as a cellular telephone.

Typically, device 50 should be highly portable and designed for handheld use. Finally, device 50 could be incorporated as part of the new generation of cellular telephones, known as Smart Phones and similar devices, which integrate the functionality of a PDA with the features of a cellular telephone and wireless local area network (WLAN) computer communication capabilities.

The present invention, in a digital format, can be realized as methods or systems in hardware, software, or a combination of hardware and software of a computer system, including a computer network system which may include the Internet. The present invention can be realized in a centralized fashion in one computer system or in a distributed fashion where different elements are spread across several computer systems. Any kind of computer system or other apparatus adapted for carrying out the methods described herein is suited. A typical combination of hardware and software may include a general purpose computer system with a computer program that, when being loaded and executed, controls the computer system such that it carries out the systems and methods described herein. The present invention may also be voluntarily embedded in a computer program product (or any computer usable medium having computer readable program code embodied therein) which comprises all the features enabling the implementation of the methods and systems described herein and which, when loaded in a computer system, is able to carry out these systems and methods.

Computer program or computer program product, in the present context, means any expression, in any language, code, or notation, of a set of instructions intended to cause a system having an information processing capability to perform a particular function, either directly or after either or both of the following: (a) conversion to another language, code, or notation; and (b) reproduction in a different material or electronic form. In addition, this system may include a subscription. The subscription service could be an individual, a group of persons, or an organization to which a user has subscribed and provided sufficient information to enable the subscription to send program information to the subscriber and/or directly to the system. The subscription service may be associated with a user fee or a subscription rate.

While the invention has been described in conjunction with specific embodiments, it is evident that many alternatives, modifications, and variations will be apparent to those skilled in the art in light of the foregoing description. Accordingly, the present invention attempts to embrace all such alternatives, modifications, and variations that fall within the spirit and scope of the appended claims.

The invention claimed is:

1. A system for providing remote interactive access to real estate related databases using a portable computing device, comprising:

a portable hand-held computing device having a screen, a keyboard, a processor, GPS circuitry integrated into the system, a microphone, an audio device, wireless circuitry, cellular circuitry, a data jack, a wireless remote, and a camera connected to a data network containing both program code and data;

a first database comprising a search engine configured to retrieve real estate listing data from an information database in real time, further comprising a set of parameters describing an individual real estate property listing;

a second database comprising a search engine configured to retrieve publicly available statistics about a specific geographic area;

a third database comprising a search engine configured to retrieve stored forms specific to completing an offer for real estate;

a remote client server defining methods for accessing the real estate information database through the database search engines;

software to contact and schedule showings for selected real estate listings, and integrate GPS coordinates of said listings to develop an efficient sequence route of access to said listings, whereby the system automatically maps the most efficient order and route for viewing said listings based on starting point and distance from each property;

a notification system to generate action reports in response to a real time change of data in the system, wherein an action report is generated to revise the sequence route of access based on a real time update of a status change of said listings from the first database.

2. The system of claim 1, wherein the screen is touch sensitive.

3. The system of claim 2, wherein the processor allows the collection of a digital signature.

4. The system of claim 1, wherein the wireless remote can be configured to automatically release a key from an electronic key box on location of a selected real estate listing upon being within a physical proximity to the electronic key box.

5. The system of claim 1, wherein the camera is integrated in a video conference or for taking pictures of a property.

* * * * *